March 11, 1924.  1,486,239
C. M. GARLAND
SHOCK ABSORBER FOR AUTOMOBILES AND OTHER VEHICLES
Filed Sept. 18, 1922
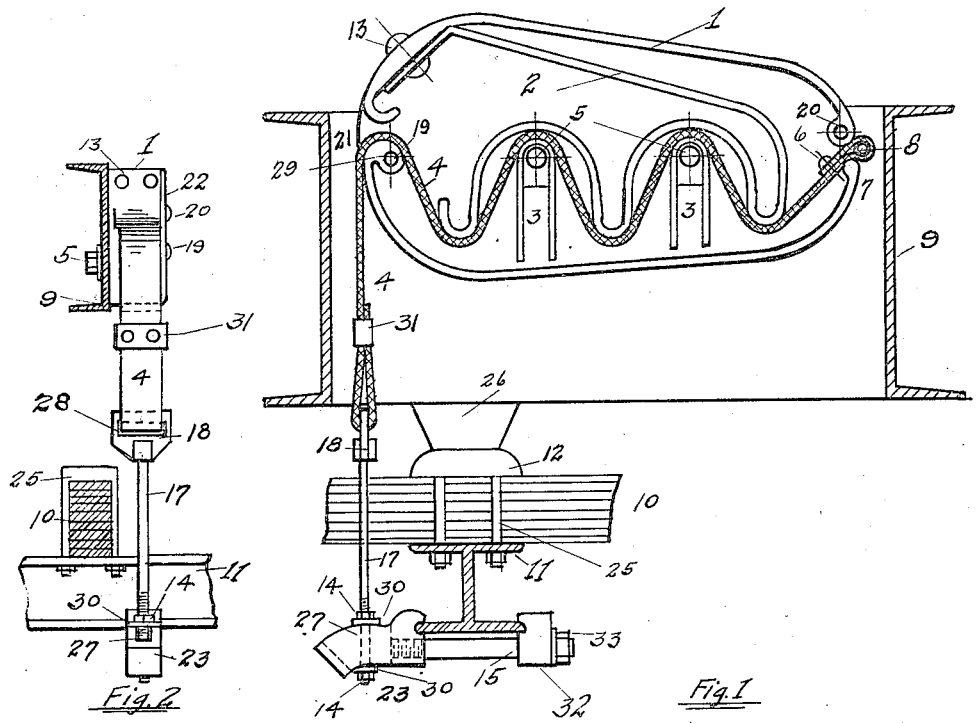
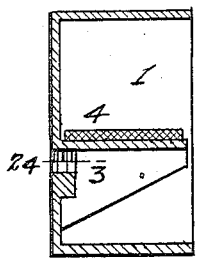
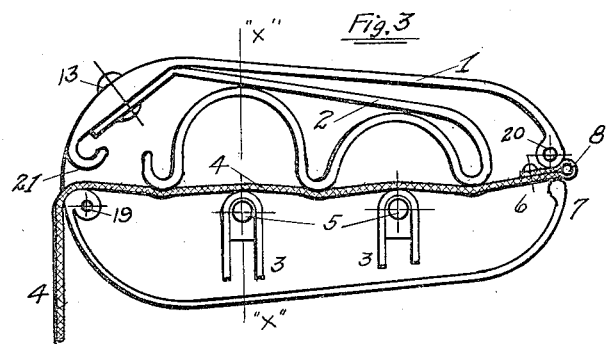

Patented Mar. 11, 1924.

1,486,239

UNITED STATES PATENT OFFICE.

CLAUDE M. GARLAND, OF CHICAGO, ILLINOIS.

SHOCK ABSORBER FOR AUTOMOBILES AND OTHER VEHICLES.

Application filed September 18, 1922. Serial No. 589,004.

*To all whom it may concern:*

Be it known that I, CLAUDE M. GARLAND, a citizen of the United States, residing at Chicago, in the county of Cook and State of Illinois, have invented new and useful Improvements in Shock Absorbers for Automobiles and Other Vehicles, of which the following is a specification.

My invention relates to shock absorbers for controlling the rebound of automobile springs and has for its object the provision of a device of this character which is silent in operation, which prevents the jostling of passengers on rough roads and in which the wearing member is easily and quickly replaceable. This device operates on the principle of a catenary which is to the effect that it requires an infinite force to pull a flexible member supported between two points into a straight line, assuming that the flexible member possesses weight. In my invention, a flexible member or strap connects the running gear of an automobile to the frame. This flexible member is carried between projections in a metallic casing and that portion of the flexible member extending between the projections is normally depressed between the said projections by resilient means with the result that as the running gear and frame of the vehicle are separated on the rebound of the vehicle spring, the flexible member tends to approach a straight line through the projections in the case with the result that the nearer the flexible member approaches a straight line, the greater the strain force which theoretically becomes infinite when the member is pulled into a straight line. By the action of this device, the rebound of the spring is gradually and slowly stopped by the rapidly increasing force in the flexible member. One such device is ordinarily mounted on the vehicle frame adjacent each wheel.

Other advantages of this device will be brought out in the following specification and the attached drawings, which form a part thereof:

Referring to the drawings, Figure 1 shows a side elevation of a shock absorber, with the cover plate removed, attached to the frame and running gear of an automobile; Figure 2 is a front elevation showing the cover plate in position; Figure 3 is a side elevation of a shock absorber showing the flexible member drawn practically into a straight line, while Figure 4 is a section on the line "X X" of Figure 3.

Referring to Figure 1, the numeral 9 indicates the frame of an automobile, 11, the axle to which the wheels are attached, 10, the vehicle spring which is attached to the axle 11 by means of the spring clips 25; 12 indicates the bumper on top of the spring clips and 26, a pad attached to the frame 9, adapted to engage the bumper 12.

The shock absorber comprises a casing 1, which is preferably made of malleable iron, which is bolted to the frame 9 by means of the tap bolts 5, which are two in number. The casing 1 is provided with the projections 3 which are shown in section in Figure 4. Numeral 2 indicates a spring, one end of which is corrugated and adapted to mesh with the projections 3 in the casing 1. The other end of the spring is riveted into the top of the casing 1 by means of the rivets 13. Numeral 4 indicates a flexible member which is preferably a leather strap. One end of this member 4 is attached to the yoke 18 by passing the end of the member 4 thru the slot 28 and bending over and clamping rigidly with the clamp 31. The yoke 18 is rigidly attached to the threaded stud 17 which passes through a slot 27 in the axle clip 23. This clip is rigidly attached to the axle 11 by means of the stud 15, the grooved head 32 and nut 33. The clip 23 is made in the form of a sector of a circle so as to permit the stud 17 to occupy different radial positions thereby making possible the lateral adjustment of the shock absorber as the most convenient location is not always with the front end vertically over the axle clip 23 as shown on the drawing.

The stud 17 is threaded to permit the taking up of slack and the adjustment of the tension in the member 4 and is rigidly held in the clip 23 by means of the nuts 14 and washers 30. The strap 4 extends through the slot 21 in the casing 1 and over the projection 29. This projection 29 is drilled to receive the screw 19 for holding the cover plate 22 in place. The strap 4 passes over the projection 29, the projections 3, and out through the slot 7 in the rear of the casing 1. In this end of the strap 4, a loop is formed by riveting over the end of the strap at 6. Into this loop a rod or tube 8 is inserted which prevents the end of the strap from slipping through the slot 7. An enlargement of the casing 1 is tapped for the screw 20 which holds the cover plate 22 in place.

The operation of the device is as follows:
The casing 1 is bolted to the frame of an automobile by means of tap bolts 5. The axle clip 23 is clamped to the axle 11 by means of the stud 15. In this position the strap 4 is inserted into the case 1 and one end held in the slot 7 by means of the tube 8. The opposite end of the strap 4 is attached to the yoke 18 in the manner previously described. The slack in the strap 4 is then pulled up by means of a wrench used on the lower nut 14, the upper nut having been backed off. The amount of tension in the strap is regulated by means of the stud 17 and ordinarily from 1" to 2" of the strap 4 are pulled out of the case against the action of the spring 2. After the tension is adjusted, the upper nut is then screwed down so that the stud is rigidly held in the slot 27 of the sector of the clip 23.

Figure 1 shows the relative position of the frame and axle of the automobile after the wheels of the car have struck an obstacle in the road with such force that the spring 10 is fully compressed under the frame until the bumper 12 rests against the pad 26 on the frame 9. In this position the slack which is produced in the strap 4 by the axle or running gear approaching the frame 9 is largely taken up in the corrugations of the spring 2 meshing with the projections 3 and 29. In this position there is no tension in the strap 4. As the wheels pass over the obstacle, the spring 10 rebounds and forces up the frame 9. When the springs are reversing their action from deflection to rebound, as shown by Figure 1, there is no tension in the strap 4. As the frame rises, however, the higher it rises, the faster it tends to travel until it is checked by the drawing out of the strap 4 from between the projections 3 and 29 until the straps assume a position as shown in Figure 3. Between the position of the strap as is shown in Figure 1 and the position of the strap as shown in Figure 3, the tension in the strap has increased from zero to theoretically an infinite amount when it comes into an approximately straight line position, as shown in Figure 3. In other words, the force increases from zero in the strap as shown in Figure 1 very rapidly until it brings the frame of the car to rest when the strap comes to almost a straight line as shown in Figure 3. In order to prevent a too sudden stopping of the frame, the shock absorber is ordinarily so adjusted that the flexible member does not come into a straight line until after the frame has passed a little above its normal position. This is done for the reason that if the frame is always stopped in the normal position, it tends to make the car ride "stiff."

Figures 1 and 3 indicate the positions of the strap in the shock absorber for the minimum and maximum separation of frame and axle, respectively. These are the conditions which maintain when the wheels of the vehicle have struck an unusually large obstacle in the road. When smaller obstacles are struck, the strap occupies intermediate positions between the positions shown in Figure 1 and Figure 3. As the axle approaches the frame, the slack produced in the strap 4 is taken up by the corrugations of the spring 2 meshing with the projections 29 and 3. As the frame and axle separate, the strap is drawn out of the casing 1 from between the corrugations and the projections 29 and 3, against the friction therebetween and the resistance of the spring bearing upon the catenaries produced by the strap passing over the projections.

From the above description it will be seen that a simple effective device has been provided for slowing up the rebound of vehicle springs and for preventing the jostling of passengers. It will be seen that the device is simple in construction, has no bearings or rotating parts, is silent in operation and is easily adjusted. It will also be seen that the only wearing part, the strap, is easily and quickly replaceable. While the elements shown and described are well adapted to serve the purpose for which they are intended, it is to be understood that the invention is not limited to the precise construction set forth but that it includes within its purview such changes as may be made within the scope of the appended claims.

What I claim is:

1. In a device of the character described, a metallic case, means for rigidly attaching the said case to one of the vehicle parts to be controlled, a slot in each end of the said case, a flexible member passing through the said case and the slots therein, an enlargement in one end of the said flexible member whereby the enlarged end of the flexible member is held rigidly in the slot in one end of the said case, projections carried within the said case and adjacent to the said flexible member, resilient means tending to press the said flexible member between the said projections, and the opposite end of the said flexible member attached to the other vehicle part to be controlled.

2. In a device of the character described a metallic case means for rigidly attaching the said case to one of the vehicle parts to be controlled, a slot in the front end of the said case, a slot in the rear end of the said case, a flexible member passing thru the said case and the slots therein, an enlargement in the end of the said flexible member adjacent to the said slot in the rear end of the said case whereby the enlarged end of the said flexible member is rigidly held in the said slot, projections rigidly mounted in the said case and under the said flexible member a spring rigidly attached at one end of the said case, the opposite end of the said spring being corrugated and adapted to mesh with the projections in the said case and press the said flexible member therebetween and the opposite end of the said flexible member attached to the other vehicle part to be controlled.

3. The combination with the frame and running gear of a vehicle of a metallic case rigidly attached to the frame of the said vehicle a slot in the front end of the said case, a slot in the rear end of the said case, a flexible member passing thru the said case and the slots therein, an enlargement in the end of the said flexible member adjacent to the slot in the rear end of the said case whereby the enlarged end of the said flexible member is held in the said slot, projections carried within the said metallic case and under the said flexible member, a spring corrugated at one end, the opposite end rigidly attached to the said case the said corrugated end being adapted to mesh with the said projections within the said case and press the said flexible member therebetween and establish frictional resistance therewith and the opposite end of the said flexible member attached to the running gear of the said vehicle.

4. In a device of the character described, a flexible member adapted to be attached at opposite ends to the frame and running gear of a vehicle, a take-up mechanism adapted to be attached to the frame of the said vehicle and resiliently enfolding one end of the said flexible member whereby slack in the said flexible member is taken up and a resistance offered on the approach and recession, respectively, of the frame and running gear, an axle clip adapted to be rigidly fastened to the axle of the said running gear, a sector formed on the said axle clip, a slot within the said sector, a stud held within the said slot and adapted to occupy different radial positions in the said sector to correspond with different lateral positions of the said takeup mechanism, means for clamping the said stud in any given radial position, and means for rigidly attaching one end of the said flexible member to the said stud.

5. The combination with the frame and running gear of a vehicle, of a case rigidly attached to the said frame of the said vehicle, a slot in each end of the said case, a flexible member passing through the said case and the slots therein, an enlargement in one end of the said flexible member whereby the said flexible member is rigidly held at one end in one end of the said case, projections rigidly mounted within the said case and under the said flexible member, a spring rigidly fastened at one end in the upper end of the said case, the opposite end of the said spring being bent around and corrugated, the said corrugated end being adapted to mesh with the said projections within the said case and press the said flexible member therebetween and establish frictional resistance therewith, the opposite end of the said flexible member attached to the running gear of the said vehicle, adjusting means for adjusting the tension in the said flexible member, and a cover for the closing of the said case, substantially as described.

In testimony whereof I have signed my name to this specification in the presence of two subscribing witnesses.

CLAUDE M. GARLAND.

Witnesses:
  M. O. RUMBLE,
  M. RIEMER.